United States Patent [19]

Nakayama

[11] Patent Number: 5,041,999

[45] Date of Patent: Aug. 20, 1991

[54] LOGARITHMIC FUNCTION ARITHMETIC UNIT INCLUDING MEANS FOR SEPARATELY PROCESSING PSEUDO DIVISION AND MULTIPLICATION

[75] Inventor: Misayo Nakayama, Tokyo, Japan

[73] Assignee: NEC Corporation, Tokyo, Japan

[21] Appl. No.: 428,301

[22] Filed: Oct. 30, 1989

[30] Foreign Application Priority Data

Oct. 28, 1988 [JP] Japan .................. 63-271013

[51] Int. Cl.$^5$ .............................. G06F 7/556
[52] U.S. Cl. .................................. 364/722
[58] Field of Search .............. 364/722, 748, 748.5

[56] References Cited

U.S. PATENT DOCUMENTS 4,089,060 5/1978 Mitchell ........................ 364/722
4,225,933 9/1980 Monden ........................ 364/722

Primary Examiner—David H. Malzahn
Attorney, Agent, or Firm—Foley & Lardner

[57] ABSTRACT

In a $\log_e(1+x/y)$ arithmetic unit by use of the STL algorithm, in order to reduce the arithmetic time, a pseudo division is at first effected by use of $w=(2X_k-Y_k)$ for k, initial values being mantissas X and Y of given $x=2^{-1} \cdot X$ and $y=2^{-j} \cdot Y$ to produce $X_m$ and $Y_m$, and thereafter, using $X_m$ and $Y_m$ as initial values a pseudo multiplication is effected by use of $X_{k+1}=(X_k+\Gamma_k)$ or $X_{k+1}=X_k/2$ for k to obtain a mantissa of $\log_e(1+x/y)$. The unit comprises coefficient generator for producing k and $\Gamma_k$, and first and second adder/subtractors accompanying with first and second registers for executing the pseudo division and the pseudo multiplication according to k and $\Gamma_k$ from the coefficient generator.

3 Claims, 3 Drawing Sheets

LOGARITHMIC FUNCTION ARITHMETIC UNIT INCLUDING MEANS FOR SEPARATELY PROCESSING PSEUDO DIVISION AND MULTIPLICATION

BACKGROUND OF THE INVENTION:

The present invention relates to a scientific computing machine and, in particular, to a logarithmic function arithmetic unit for use in the machine.

As a known logarithmic function arithmetic method, the so called STL (Sequential Table Lookup) method is known to be suitable for a computing machine of a microprogram control type, and is efficient, especially, for a computing machine which doesn't have a high speed multiplier.

A known logarithmic function arithmetic unit using the STL method comprises a single barrel shifter and a single adder/subtractor and effects loop processes of the STL method under the microprogram control.

However, the known arithmetic unit suffers from the following problems.

When it is provided that b (b is an integer) clocks are required for processing one loop process of the STL, (n×b) clocks (n being an integer) are required for processing n loop processes of the STL to compute a logarithmic function. This means that it takes a long time for computing a logrithmic function.

Further, the arithmetic result is not of high precision, since for example, the number of significant digits are reduced.

SUMMARY OF THE INVENTION

Therefore, it is an object of the present invention to provide a logarithmic function arithmetic unit which has hardware for effecting the STL method to thereby considerably reduce the computing time in comparison with use of the microprogram control.

It is another object of the present invention to provide a logarithmic function arithmetic unit which can produce a computed result with precision and with an increased number of significant digits.

According to the present invention, a logarithmic function arithmetic unit is obtained which comprises coefficient producing means for producing $2^k \log_e(1+2^{-k})$ and $\log_e(1+2^{-k})$ for $k=(m-1)$ to $k=0$; first and second register means; barrel shifter means for rightwardly shifting a value stored in the second register means by k digits; first adder/subtractor means for adding or subtracting a content of the barrel shifter, a content in the coefficient producing means, or zero to a content in the first register means to produce a first result, the first result being stored in the first register means; second adder/subtractor means for the content in the first register means or zero to the content of the second register means to produce a second result, the second result being stored in the second register means; first-in last-out stack means responsive to a sign indication bit in the second register means for controlling the arithmetic in the first and second adder/subtractor means; and dividing means for dividing the content in the first register means by the content in the second register means.

DESCRIPTION OF PREFERRED EMBODIMENTS

Figure 1:
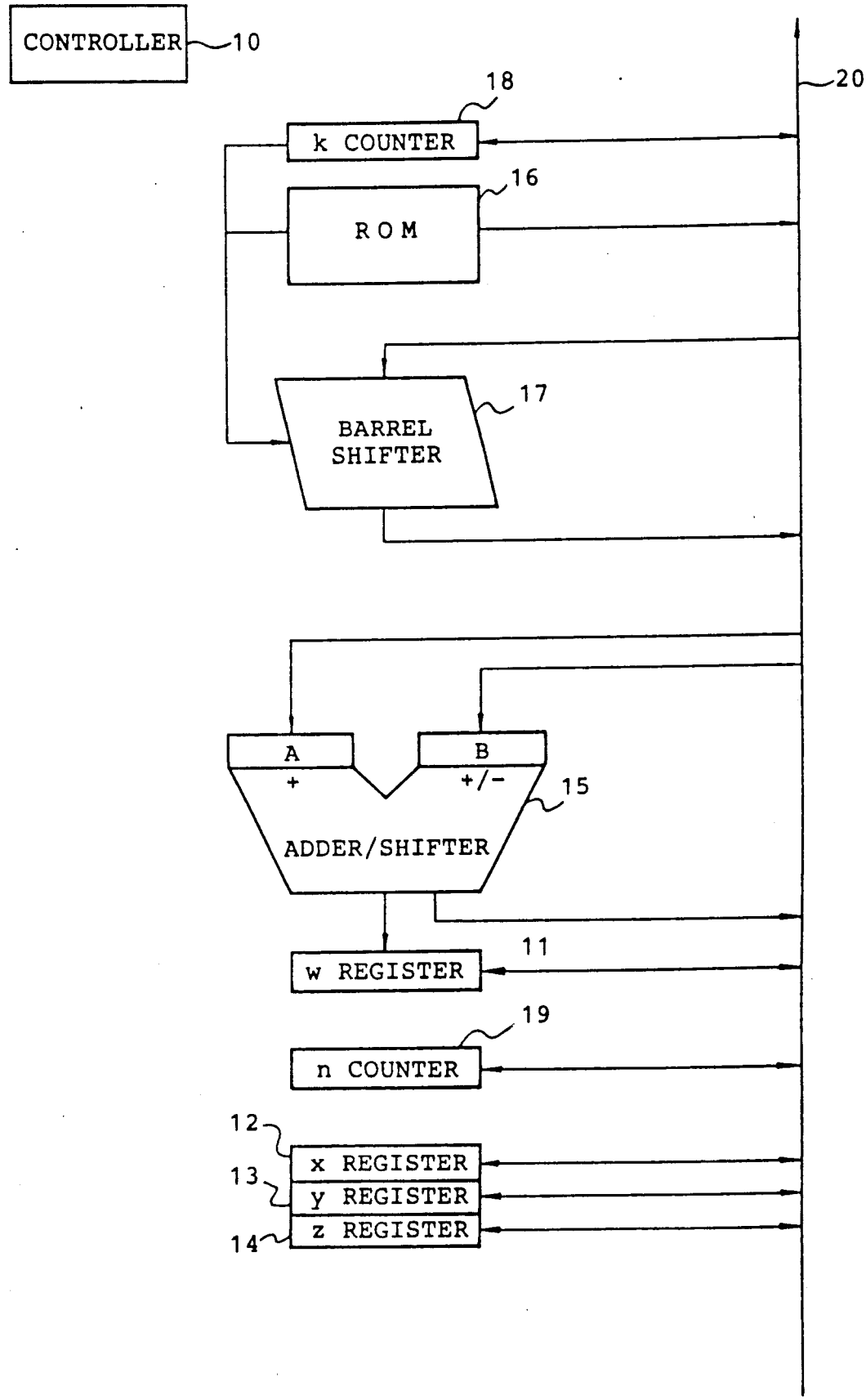
FIG. 1 is a block diagram view of a known logarithmic function arithmetic unit using the microprogram control.

Prior to description of preferred embodiment of the present invention, description is made as to the STL method and a known logarithmic function arithmetic unit using microprogram control in order to help better understand the present invention.

The STL method will be described below for computing a logarithmic function $\log_e(1+x)$ with a precision of n digits in the binary system.

A given value x is represented by the following equation (1) by use of a sequence of numbers $\{a_k\}$, as is known in the art:

$$x = (1+2^{-1})a_0 + (1+2^{-2})a_1 + \cdots \times (1+2^{-(n-1)})a_{(n-1)} \times \epsilon \quad (1)$$

$$a_k = \{+1, 0\} \quad (2)$$

Therefore, $$\log_e(1+x) = a_0 \times r_0 + a_1 \times r_1 + \cdots + a_{n-1} \times r_{n-1} + \epsilon \quad (3)$$

$$r_k = \log_e(1+2^{-k}) \quad (4)$$

In equations (1) through (4), it is defined as a pseudo division to obtain $\{a_k\}$ from x and it is defined as a pseudo multiplication to obtain $\log_e(1+x)$ from $\{a_k\}$.

Algorithm of the STL method

Now, the algorithm of the STL method will be described below.

Process I. $x_0 = x$ ($\frac{1}{2} \leq x < 1$), $y_0 = 1$, and $z_0 = 0$ are given as initial values.

Process II. For $k = 0, 1, 2, \ldots, (n-1)$, the following process III are repeated.

Process III. $w = x_k - y_k$ \quad (5), when $w \geq 0$, the following equations (6) through (9) are computed:

$$a_k = +1 \quad (6)$$

$$x_{k+1} = w \quad (7)$$

$$y_{k+1} = y_k + 2^{-k} \times y_k \quad (8)$$

$$z_{k+1} = z_k + r_k \quad (9)$$

when $w < 0$, the following equations (10) through (13) are also computed:

$$a_k = 0 \quad (10)$$

$$x_{k+1} = x_k \quad (11)$$

$$y_{k+1} = y_k \quad (12)$$

$$z_{k+1} = z_k \quad (13)$$

Process III is called as an STL loop. The STL loop is repeated n times.

Process IV. $\log_e(1+x_0/y_0) = \log_e(1+x_0) = Z_n$ is obtained.

Referring to FIG. 1, a known logarithmic function arithmetic unit shown therein uses the STL algorithm as described above. The arithmetic unit comprises w, x, y, and z registers 11, 12, 13 and 14 for holding w, $x_k$, $y_k$ and $z_k$, respectively, an adder/subtracter 15 for effecting addition/subtraction of two inputs A and B, a read-only memory (ROM) 16 for generating $r_k$, a barrel shifter 17 for shifting an input value by desired digits rightwardly, k counter 18 for providing k to read-only memory 16 and a digit number to be shifted at the barrel shifter 17, and a loop number control counter or n counter 19 for controlling the STL loop number. Those registers 11-14, adder/subtracter 15, read-only memory 16, barrel shifter 17, and counters 18 and 19 are connected through a data bus 20. The unit comprises a micro controller 10 for controlling those blocks 11-19.

Now, operation of the arithmetic unit will be described below with reference to FIG. 2.

Operation 1. According to Process I, initial values $x_0$, $y_0$ and $z_0$ are set in the x, y and z counters 12, 13 and 14, respectively, at steps 21, 22 and 23 as shown in FIG. 2. Values n and 0 are set in the loop number control counter 19 and k counter 18 at steps 24 and 25 in FIG. 2.

Operation 2. According to Process II, the following operation 3 is repeated until content of the loop number control counter 19 becomes 1.

Operation 3. The arithmetic unit executes the STL loop of Process III as follows.

Contents $x_k$ and $y_k$ in x and y counters 12 and 13 are transferred to the adder/subtracter 15 as inputs A and B, respectively, through the data bus 20 under control of the micro controller 10. The adder/subtracter 15 makes $(x_k - y_k)$ which is supplied to the w register 11. The w register 11 holds $(x_k - y_k)$ as w. Thus, Equation (5) is given at a step 26 as shown in FIG. 2.

Figure 2:
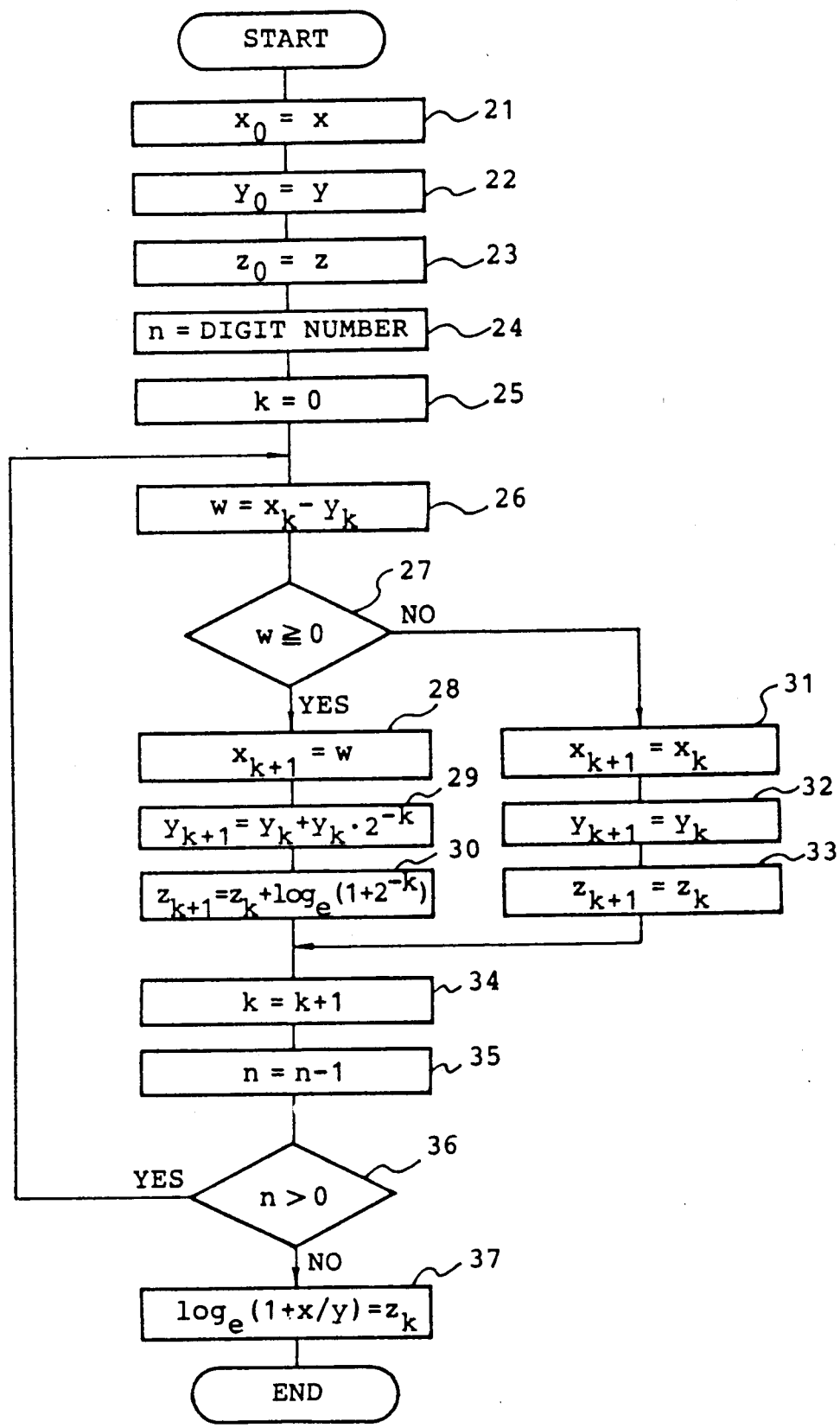
FIG. 2 is a flow chart for illustrating the arithmetic processes in the known unit of FIG. 1.
Figure 3:
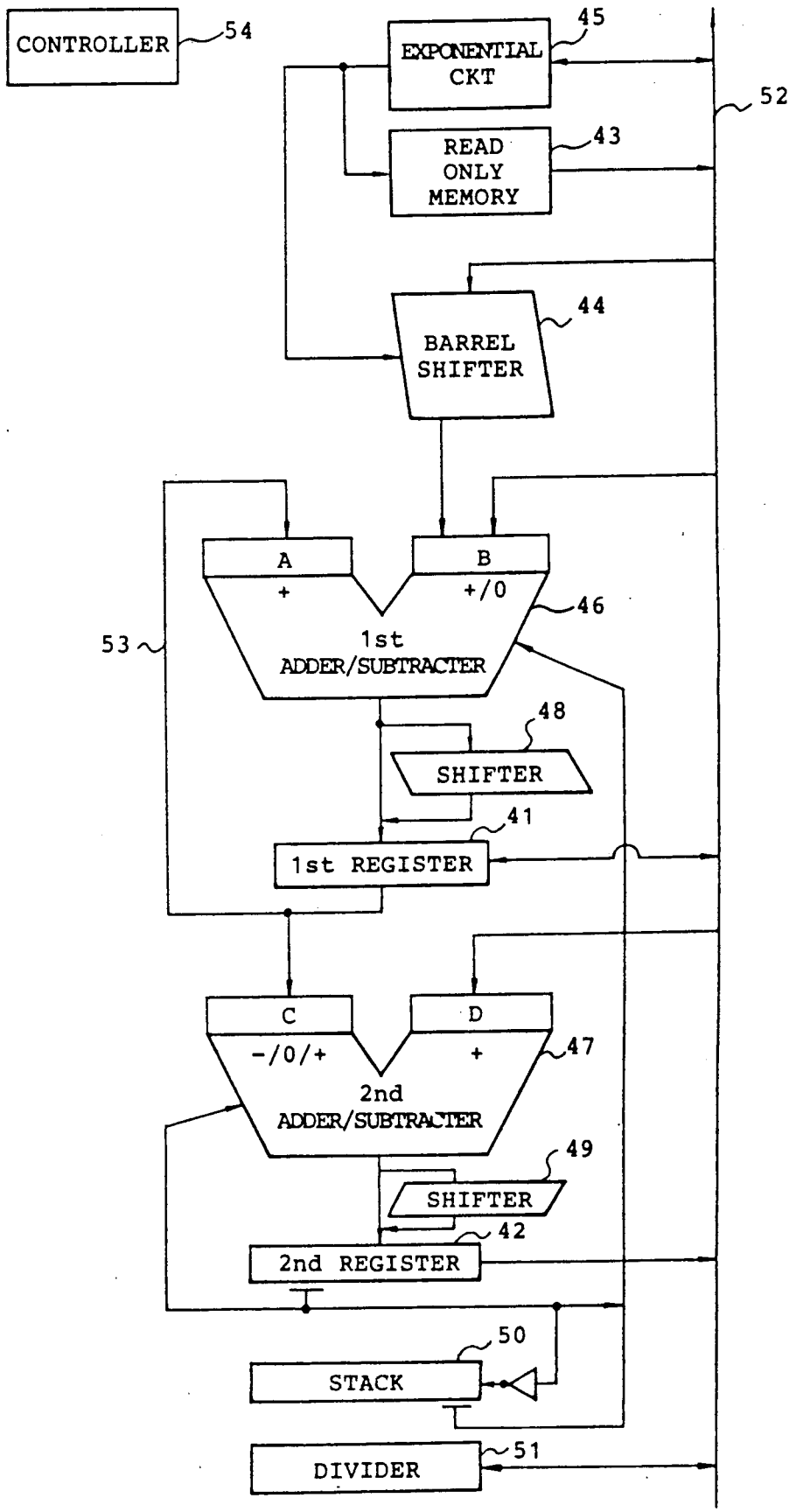
FIG. 3 is a block circuit diagram view of a logarithimic function arithmetic unit according to an embodiment of the present invention.

When $w \geq 0$ at a step 27 in FIG. 3. that is, a sign digit in the w register 11 indicates positive, the following operation is effected under control of the micro controller 10. The content w in the w register 11 is transferred to the x register 12 at a step 28. Thus, Equation (7) is obtained. Then, $y_k$ is transferred from y register 13 to the adder/subtracter 15 as the A input and to the barrel shifter 17. The $y_k$ is shifted by the shifted digit number supplied from the k counter 18 to produce $y_k \cdot 2^{-k}$ which is supplied to the adder/subtracter 15 as the B input. Then, the adder/subtracter 15 makes $(A+B) = (y_k + y_k 2^{-k})$ which is transferred to the y register 13 at a step 29 shown in FIG. 2. Thus, Equation (8) is obtained. Then, $z_k$ in the z register 14 is transferred to the adder/subtracter 15 as the A input, while a constant indicated by the k counter 18, that is, $r_k$ is read from the read-only memory 16 and is supplied to the adder/subtracter 15 as the B input. The adder/subtracter 15 makes $(A+B) = (z_k + r_k)$ which is transferred to the z register at a step 30. Thus, Equation (9) is obtained.

When $w < 0$, that is, a sign digit in the w register 11 indicates negative at step 27, the arithmetic unit does nothing as shown at steps 31, 32 and 33.

After a loop of steps 26 to 30 or 33 is completed, the content of k counter 18 is increased by one (1) at step 34 and the content of loop number control counter 19 is reduced by one (1) at step 35 as shown in FIG. 2. The loop is repeated until the content of loop number control counter 19 becomes 0.

Operation 4. When the content of loop number control counter 19 is 0 at the step 36, the operation 3 is completed. Then, the content of the z register 14 provides an arithmetic result of $\log_e(1+x_0)$ as shown at step 37 in FIG. 2.

In the known arithmetic unit, the above-described operation is executed under the microprogram control. Providing that b clocks are required for processing the STL loop in operation 3 one time, $(n \times b)$ clocks are required for obtaining the arithmetic result. Therefore, it takes a long time to compute the logarithmic function.

Further, since $r_k$ of Equation (4) is reduced by increase of k, significant digits are reduced so that rounding errors are accumulated at the least significant bit. Moreover, since Equations of (7), (8), (9), (11), (12) and (13) are computed with use of fixed-point numbers, conversion must be made between the fixed-point system and the floating-point system when x and $\log_e(1+x)$ are represented by use of the floating-point system. In conversion of x of a small number from the floating-point system to the fixed-point system, the significant digits are considerably reduced. Therefore, the known unit is low in the precision.

In order to resolve those problems of the known arithmetic unit using the STL method under the microprogram control, the present invention attempts to use a modified STL method so as to seperately perform the pseudo division and the pseudo multiplication by use of hardware such as a single barrel shifter, two adder/subtracters, a stack of a first-in last-out type and a divider without use of the microgram control.

Modified STL method

Although the pseudo division and the pseudo multiplication are executed simultaneously or corelatively in the conventional STL method, the former is at first executed and then the latter is done in the modified STL method.

In the conventional STL method, $\epsilon$ (pseudo reminder) in Equation (1) is ignored and the pseudo multiplication is executed using $y_0 = 1$ as the initial value. Therefore, n-times of the STL loop are required for achieving a n-digit precision in the binary system.

In Equation (1), $\epsilon < 2^n$. Therefore, in order to achieve 2n-digit precision in the binary system according to the modified STL method, the pseudo multiplication is executed by use of approximation $\log_e(1+\epsilon) \approx \epsilon$ which is accepted according to the Taylor expansion. Accordingly, the total step number of the pseudo division and the pseudo multiplication is about n which is equal to the step number in the conventional STL method.

In the modified STL method, $y_k$ is shifted to a lower digit at one step of the pseudo division in order to improve the precision. On the contrary, $x_k$ is shifted to a higher digit in the pseudo multiplication.

Further, using $Xm = Xm/Ym$ as the initial value where Xm is a remainder of a pseudo division and $$Y_m = \sum_{k=1}^{m} (1+2^{-k})^{a_k},$$

the pseudo multiplication given by the following equation (14) is repeated from k = m to k = (i+1):

$$X_{k-1} = X_{k-1} + a_k \qquad (14)$$

Since x and y are floating-point numbers and since $\log_e(1+x/y) \approx x/y$ for $x/y < 1$, the pseudo division is stated from an intermediate step while the pseudo multiplication is stopped at an intermediate step. As a result, one may prevented the reduction of significant digits due to digit matching and, more over, performance is improved.

Algorithm of the modified STL

Now, description is made as to the algorithm of the modified STL for computing $\log_e(1+x/y)$ with n (=2 m) digit precision.

Process I. x and y are inputted ($0 \leq x < y < \infty$).

Process II. X, Y, i and j are determined for satisfying $x = 2^{-i} X$ ($1 \leq X < 2$, i being an integer) and $y = 2^{-j} \cdot y$ ($1 \leq Y < 2$, j being an integer), X and Y are mantissa portions of x and y, respectively, while i and j are exponential portions of x and y, respectively. Values $x_i = X$, $y_j = Y$ and $i = (j-i)$ are selected as initial values.

Process III. For $k = i, (i+1), (i+2), \ldots, (m-1)$, the following process IV is repeated, that is, pseudo division is executed. Herein, m is an integer larger than $(i+1)$.

Process IV. The following equation (15) is given:

$$W = 2X_k - Y_k \tag{15}$$

When $W \geq 0$, the following equations (16) to (18) are obtained:

$$a_k = +1 \tag{16}$$

$$Y_{k+1} = Y_k + 2^{-k} \cdot Y_k \tag{17}$$

$$2 \cdot X_{k+1} = 2 \cdot W \tag{18}$$

When $W < 0$, the following equations (19) to (21) are obtained:

$$a_k = 0 \tag{19}$$

$$Y_{k+1} = Y_k \tag{20}$$

$$2 \cdot X_{k-1} = 2 \cdot 2 \cdot X_k \tag{21}$$

Process V. $Y_m$ given by the following equation (22) is selected as an initial level for the pseudo multiplication:

$$X_m = X_m / Y_m \tag{22}$$

Process VI. For $k = m, (m-1), (m-2), \ldots, (i+1)$, the following process VII is repeated, that is, the pseudo multiplication is executed.

Process VII. For $a_k = +1$, $$X_{k+1} = (X_k + \Gamma_k)/2 \tag{23}$$

$$\Gamma_k = 2^k \cdot r_k = 2^k \cdot \log_e(1 + 2^{-k}) \tag{24}$$

are computed, while for $a_k = 0$, $$X_{k+1} = X_k / 2 \tag{25}$$

is computed.

Process VIII. $\log_e(1+x/y) = X_i$ is obtained.

Arithmetic Unit using the Algorithm of Modified STL method

Now, a logarithmic function arithmetic unit using the above algorithm of the modified STL method will be described with reference to FIG. 3.

Referring to FIG. 3, the arithmetic unit shown therein comprises a first and a second register 41 and 42 for holding two variables YK and $2Y_k$, a read-only memory 43 for generating a constant $\Gamma_k$ given by Equation (24), a barrel shifter 44 for shifting a value of a variable supplied from the second register 42, an exponential circuit 45 for executing Process II and for controlling a digit number to be shifted at the barrel shifter 44 and an address of the read-only memory 43, a first adder/subtracter 46 for effecting addition/subtraction of two inputs A and B so as to execute Equations (17) and (18), a second adder/subtracter 47 for effecting addition/subtraction of two inputs C and D so as to execute Equation (15), a first shifter 48 for shifting an output value from the first adder/subtracter 46 to produce a half value, a second shifter 49 for shifting an output value from the second adder/subtractor 47 to produce a twice value, a stack of a first-in last-out type 50 for holding an inversion of a sign indication bit of a value in the second register 42 so as to control the addition, subtraction or transferring in the first and the second adder/subtractors 46 and 47, and a divider 51 for executing Process V, which are connected to one another through a data bus 52. An output of the first register 41 is connected to the first and the second adder/subtractors 46 and 47 as inputs A and C, respectively, through another data bus 53. The unit further comprises a controller 54 for controlling the blocks 41-51.

Operation of the Arithmetic Unit of FIG. 3

Now, description will be made as to the operation of the arithmetic unit of FIG. 3 below, according to the Algorithm of the modified STL method.

Operation 1. According to Process I, binary floating-point numbers x and y are supplied onto the bus 52. Where $0 \leq x < y < +\infty$.

Operation 2. The exponential circuit 45 receives the numbers x and y and executes Process II to obtain the mantissa portions X and Y and the index portions i and j and $j = (i - j)$. Y and $2 \cdot X$ are transferred under control of the controller 54 to the first and the second registers 41 and 42, respectively, through the bus 52.

Operation 3. According to Process III, the following operation 4 is repeated with k being incremented by 1 from $k = i$ to $k = (m-1)$, that is, the pseudo division is executed. The incrementation is performed by the exponential circuit 45.

Operation 4. At first, $Y_k$ is supplied from the first register 41 to the second adder/subtractor 47 as an imput C through the data bus 53, while $2X_k$ is supplied from the second register 42 to the second adder/subtractor 47 as another input D. The adder/subtractor 47 subtracts the input C from the input D to produce $W = 2X_k - Y_k$ which is shifted by the shifter 49 and written as $2X_{k+1} = 2W$ into the second register 42. Thus, Equation (15) is completed.

Then, a sign indication digit of the value in the second register 42 is pushed out and supplied to the stack 50. $Y_k$ is supplied from the first register 41 to the first adder/subtractor 46 as input A through the data bus 53 and is also supplied to the barrel shifter 44 through the data bus 52. The barrel shifter 44 shifts $Y_k$ by the digit number indicated by the exponential circuit 45 to produce $2^{-k} \cdot Y_k$ which is supplied to the first adder/multiplier 46 as input B. When the sign indication bit indicates positive in the second register 42, that is, $a_k = +1$, the first adder/subtractor 46 makes $(A+B) = (Y_k + 2^{-k} \cdot Y_k)$ which is supplied to the first register 41. As a result, Equation (17) is obtained.

On the other hand, when the sign indication bit is negative, the second adder/subtractor 47 makes $(0+D) = 2X_k$ which is shifted at the second shifter 49 to produce a twice value of $2 \cdot 2 \cdot X_k$. The value $2 \cdot 2 \cdot X_k$ is held in the second register 42. Thus, Equation (21) is obtained.

Operation 5. According to Process V, the divider 51 divides $X_m$ held in the second register 42 by $Y_m$ held in the first register 41 to form $X_m = X_m/Y_m$ which is supplied to the first register 41 as an initial value for the pseudo multiplication.

Operation 6. According to Process VI, the following operation 7 is repeated with k being decremented by 1 from $k = m$ to $k = (i+1)$, that is, the pseudo multiplication is executed. The decrementation is also performed by the exponential circuit 45.

Operation 7. $X_k$ is supplied from the first register 41 to the first adder/subtractor 46 as input A through the data bus 53. Simultaneously, $\Gamma_k$ is supplied from the read-only memory 43 to the first adder/subtractor 46 as input B. At that time, when a positive number is popped from the stack 50, that is $a_k = +1$, the first adder/subtractor 46 makes $(A+B) = (X_k + \Gamma_k)$ which is shifted at the first shifter 48 to produce $(X_k + \Gamma_k)/2$. Then, $(X_k + \Gamma_k)/2$ is held as $X_{k+1}$ in the first register 41. Thus, Equation (23) is obtained. On the other hand, a negative number is popped from the stack 50, that is $a_k = 0$, the first adder/subtractor 46 makes $(A+0)$ to produce $X_k$. The $X_k$ is shifted by the first shifter 48 to produce $X_k/2$ which is held as $X_{k+1}$ in the first register 41. Thus, Equation (25) is obtained.

Operation 8. As a result, the content X in the first register 41 provides a mantissa portion of $\log_e(1+x/y)$.

Each of Operations 4 and 7 is executed by one clock. Therefore, the entire processing time is $2(m-i)$ clocks which is equal to or smaller than n clocks.

The operation has been described in connection with use of floating-point numbers but the arithmetic unit of the present invention can use fixed-point numbers by fixing the index portion i to be 0.

What is claimed is:

1. A logarithmetic function arithmetic unit for computing a function of $\log_e(1+x/y)$, which comprises:

means responsive to input numbers x and y ($0 \leq x < y < +\infty$) for computing mantissa portions X and Y ($1 \leq X < 2$, $1 \leq Y < 2$) and exponential portions i and j (i and j being integers) of x and y respectively, to satisfy $x = 2^{-i} \cdot X$ and $y = 2^{-j} \cdot Y$, said computing means producing constants of $k = 0, 1, \ldots i, (i+1), (i+2), \ldots, (m-1)$ and m, m being an integer greater than $(i+1)$;

coefficient producing means coupled with said computing means for producing a coefficient of $\Gamma_k = 2^k \log(1 + 2^{-k})$ for $k = (m-1)$ to $k = 0$;

first register means for holding a first held value, said first register means coupled to said computing means and initially holding $Y_k = Y_i = Y$ as said first held value;

second register means for holding a second held value, said second register means coupled to said computing means and initially holding $2X_k = 2X_i = 2X$ as said second held value;

barrel shifter means coupled to said computing means and said second register means for shifting said second held value by k digits to produce a shifted value $2^{-k} \cdot Y_k$;

first adder/subtractor means having a first primary input means coupled to said first register means and a first secondary input means, said first primary input means receiving said first held value as a first primary input value, said first secondary input means receiving a first secondary input value, said first adder/subtractor means adding said first primary and secondary input values to produce a first sum;

second adder/subtractor means having a second primary input means and a second secondary input means coupled to said second register means, said second primary input means receiving said second held value as a second secondary input value, said second adder/subtractor means adding or subtracting said second primary input value to or from said second secondary input value to produce a second sum;

control means controlling said first and second adder/subtractor means, and said barrel shifter means for producing the following operations for $k = i, (i+1), (i+2), \ldots, (m-1), m$;

said second adder/subtractor means receiving said first held value as said second primary input value and subtracting said second primary input value from said second secondary input value to produce $W = 2X_k - Y_k$ as said second sum;

said second register means holding $W = 2X_k - Y_k$ as said second held value;

first-in last-out stack means coupled to said second register means for stacking a sign indicating value, said sign indicating value being "1" when said second held value is positive or zero, said sign indicating value being "0" when said second held value is negative;

said control means controlling said first adder/subtractor means to make the following operations for $k = m, (m-1), (m-2), \ldots (i+1)$.

said first adder/subtractor means receiving said shifted value $2^{-k} \cdot Y_k$ as said first primary input value when said second held value is positive or zero, said first adder/subtractor means producing $Y_{k+1} = Y_k + 2^{-k} \cdot Y_k$ as said first sum, said first sum being delivered to said first register means, said first register means eventually holding $Y_m$ as said first held value; and said second adder/subtractor means being set "0" as said second primary input value when said second value is negative, said second adder/subtractor means producing $X_{k+1} = 2X_k$ as said second sum;

twice means coupled to said second adder/subtractor means for producing a value twice that of said second sum, said twice value being delivered to said second register means, so that said second register means eventually holds $2X_m$ as said second held means;

divider means coupled to said first and second register means for dividing under control of said control means a half of said second held value $2X_m$ by said first held value $Y_m$ to produce a divided result of $X_m = X_m/Y_m$, said divided result $X_m$ being delivered as $X_k$ to said first register means as said first held value;

said first adder/subtractor means receiving, under control of said control means, said coefficient $\Gamma_k$ as said first secondary value when said sign indication value "1" is popped from said first-in last-out stack means, said first adder/subtractor means producing $(X_k+\Gamma_k)$ as said first sum, said first adder/subtractor means being set "0" as said first secondary value when said sign indication value "0" is popped from said first-in last-out stack means, said first adder/subtractor means producing $X_k$ as said first sum; and shifter means coupled to said first adder/subtractor means for shifting said first sum under control of said control means to produce $X_{k+1}=(X_k+\Gamma_k)/2$ alternatively $Y_{k+1}=X_k/2$ as a shifted value, said shifted value being delivered to said first register means and being held as said first held value, said first held value finally representing a mantissa $X_i$ of said $\log_e(1+x/y)$.

2. A logarithmic function arithmetic unit as claimed in claim 1, wherein i is maintained 0 so that the arithmetic is executed by use of fixed-point system.

3. A logarithmic function arithmetic unit as recited in claim 1 wherein said coefficient producing means comprises a read only memory.

* * * * *